United States Patent [19]
Burguette

[11] 3,888,912
[45] June 10, 1975

[54] PROCESS FOR MAKING BETA-ACRYLOYLOXYPROPANOIC ACID
[75] Inventor: Mario D. Burguette, North St. Paul, Minn.
[73] Assignee: Minnesota Mining and Manufacturing Company, St. Paul, Minn.
[22] Filed: Aug. 20, 1973
[21] Appl. No.: 389,945

[52] U.S. Cl.... 260/486 R; 204/159.15; 204/159.22; 260/89.55
[51] Int. Cl............................................ C07c 69/54
[58] Field of Search ............................... 260/486 R

[56] References Cited
OTHER PUBLICATIONS
Stille, J. K., Introduction to Polymer Chemistry, J. Wiley & Sons, Inc., N.Y. 9, 1963.

Primary Examiner—Lorraine A. Weinberger
Assistant Examiner—Paul J. Killos
Attorney, Agent, or Firm—Alexander, Sell, Steldt & DeLaHunt

[57] ABSTRACT
β-acryloyloxypropanoic acid is produced by heating acrylic acid in the presence of aluminum chloride.

6 Claims, No Drawings

PROCESS FOR MAKING BETA-ACRYLOYLOXYPROPANOIC ACID

Acrylic acid can be converted into relatively pure β-acryloyloxypropanoic acid (AOP). AOP has been found useful in radiation polymerization techniques such as those described in U.S. application Ser. No. 389,946, filed concurrently with this application. The dimerization of acrylic acid into AOP also presents a technique for purifying acrylic acid. This can be accomplished by dimerizing impure acrylic acid, separating the AOP which is more readily purified than the acrylic acid, and subsequently breaking the AOP down to acrylic acid again by heating the AOP.

Acrylic acid is converted to β-acryloyloxypropanoic acid when heated in the presence of catalytic amounts of anhydrous aluminum chloride. A further understanding of the present invention may be obtained from the following examples.

EXAMPLE I

Anhydrous aluminum chloride (13.0 g $AlCl_3$) was incrementally added to a vessel containing 300 g. of acrylic acid. The acrylic acid was stirred continuously to insure that a solution of the acid and aluminum chloride was formed. The solution was heated to 156°–158° C. for over an hour in a round-bottomed flask equipped with thermometer and reflux condenser. The solution was gently stirred during the heating. The reaction was stopped and the solution allowed to cool to about 100° C. After suction-filtering to separate any precipitate that may have formed, the unreacted acid and other volatile matter was distilled off under reduced pressure on a steam bath under a mild current or nitrogen. The residual oily liquid was fairly pure AOP, which can be easily purified further by fractional distillation, collecting that portion which distills at 101°–103°C. at 0.17–0.19 mm Hg.

The AOP obtained is readily polymerizable in electron beam polymerization systems, and is soluble or miscible in most common solvents including water. Under high temperatures (above 175°C. at atmospheric pressure AOP decomposes into polyacrylic acid, and at pot temperatures of about 110°C. at 0.17–0.19 mm starts breaking down into acrylic acid.

The AOP may be polymerized by itself or with other monomeric or polymeric materials. Such comonomers include unsaturated polyesters such as the condensation product of maleic acid and propanediol, as well as any ethylenically unsaturated polymerizable monomer.

EXAMPLE II

The general configuration of the electron beam source involves a vacuum chamber, with a heated filament source of electrons within. The electrons are accelerated from the source toward the Lenard window with energy of from 100 KEV to 10 MEV so that the electrons pass through the window and retain sufficient energy to penetrate the thickness of the material to be cured. The material to be cured may be placed on a conveyor or other transporting apparatus in the path of the electrons. The electron flow or current and the time of electron impingement are related such that for an electron flow of 0.1 to 100 ma., a treatment duration of a fraction of a second may be required.

A 20–35μ liquid film of AOP was deposited on a glass slide and exposed to an electron beam source set at 105 KEV and 2.5 milliamps through nitrogen. A dry, clear, solid polymeric flim was produced within one second of exposure. The film was insoluble in most solvents.

EXAMPLE III

One part of an acrylic monomer, 2,2-bis[p-(2-acryloyloxyethoxy)phenyl] propane, was dissolved in one part of AOP and the solution coated (20–35μ film) on a glass slide. The coated slide was exposed as in Example II. A dry, glossy, tough, clear film was produced which was insoluble in most solvents.

EXAMPLE IV

One part of an olefinically unsaturated polyester, the commercially available "Paraplex 70" from Rohm and Hass was dissolved in 1.5 parts of AOP. This solution was deposited as a film (20–35μ) on a glass slide and exposed as in Example II. On exposure to the electron beam source a clear film formed which was insoluble in most solvents.

I claim:

1. The process for producing β-acryloyloxypropanoic acid which comprises heating acrylic acid in the presence of a catalytic amount of aluminum trichloride.

2. The process of claim 1 wherein the aluminum trichloride is anhydrous.

3. The process of claim 2 wherein the aluminum trichloride is dissolved in the acrylic acid.

4. The process of claim 1 wherein the reaction is carried out at about 150°–160° C.

5. The process of claim 2 wherein the reaction is carried out at about 150°–160° C.

6. The process of claim 3 wherein the reaction is carried out at about 150°–160° C.

* * * * *